United States Patent
Au et al.

(10) Patent No.: US 8,452,124 B2
(45) Date of Patent: May 28, 2013

(54) METHOD AND SYSTEM FOR DETECTING MOTION BLUR

(75) Inventors: Kwong Wing Au, Bloomington, MN (US); Scott McCloskey, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 524 days.

(21) Appl. No.: 12/771,344

(22) Filed: Apr. 30, 2010

(65) Prior Publication Data

US 2012/0162448 A1 Jun. 28, 2012

(51) Int. Cl.
*G06K 9/36* (2006.01)

(52) U.S. Cl.
USPC ............... 382/280; 382/275; 382/255

(58) Field of Classification Search
USPC .................................. 382/275, 255
See application file for complete search history.

(56) References Cited

U.S. PATENT DOCUMENTS

| | | | |
|---|---|---|---|
| 5,696,848 | A | 12/1997 | Patti et al. |
| 7,154,541 | B2 | 12/2006 | Kondo et al. |
| 7,176,962 | B2 | 2/2007 | Ejima |
| 2008/0095400 | A1 | 4/2008 | Nagano et al. |
| 2011/0096180 | A1 * | 4/2011 | McCloskey et al. ....... 348/208.4 |

FOREIGN PATENT DOCUMENTS

GB 2459760 A 11/2009

OTHER PUBLICATIONS

Mohsen E. Moghaddam et al, Finding Point Spread Function of Motion Blur Using Radon Transform and Modeling the Motion Length, IEEE 2004.*
Shiqian Wu et al, Blind Blur assessment for vision-based applications, Elsevier JVCIR 2009.*
"Great Britain Application Serial No. 1102684.6, Office Action mailed Jun. 1, 2011", 6 pgs.
Mohammadi, J., et al., "Vehicle Speed Estimation Based on the Image Motion Blur Using RADON Transform", *Proceedings, 2010 2nd International Conference on Signal Processing Systems (ICSPS)*, (2010), VI-243-VI-247.

* cited by examiner

*Primary Examiner* — Chan S Park
*Assistant Examiner* — Mark Roz
(74) *Attorney, Agent, or Firm* — Schwegman, Lundberg & Woessner, P.A.

(57) ABSTRACT

A system for detecting motion blur may include a process in which one or more digital images taken by a camera having a shutter are obtained, wherein the digital image depicts objects in a physical world. Further, the system may estimate the motion blur in the digital image using a ratio of one or more values obtained from the projection of a 2D spectrum of the image and a Fourier transform of a sequence of the shutter used in obtaining the image.

2 Claims, 5 Drawing Sheets

METHOD AND SYSTEM FOR DETECTING MOTION BLUR

GOVERNMENT RIGHTS

This invention is made with government support under United States Army RDECOM, grant number W91CRB-09-C-0013 awarded by the United States Army. The government has certain rights in the invention.

TECHNICAL FIELD

The present technology relates to methods for processing biometric images, and in particular for addressing image quality issues relating to motion blur.

BACKGROUND

In many applications, imagery acquired from a camera may require processing before it can be used for its intended task. The post-capture image process may address several aspects of image quality, but one of particular interest is image blur. In many image-based systems motion blur is a particular problem for images of moving objects, especially for iris matching and recognition, a method of biometric identification or authentication that uses pattern-recognition techniques based on high-resolution images of the irises of an individual's eyes. Iris recognition uses camera technology, typically with subtle infrared illumination reducing specular reflection from the convex cornea, to create images of the detail-rich, intricate structures of the iris. Converted into digital templates, these images provide mathematical representations of the iris that yield unambiguous positive identification of an individual.

BRIEF DESCRIPTION OF THE DRAWINGS

The accompanying figures, in which like reference numerals refer to identical or functionally-similar elements throughout the separate views and which are incorporated in and form a part of the specification, further illustrate the present technology and, together with the detailed description of the technology, serve to explain the principles of the present technology.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of systems and methods are illustrated in the various views, those skilled in the art will recognize that many of the examples provided have suitable alternatives that can be utilized.

Figure 1A:
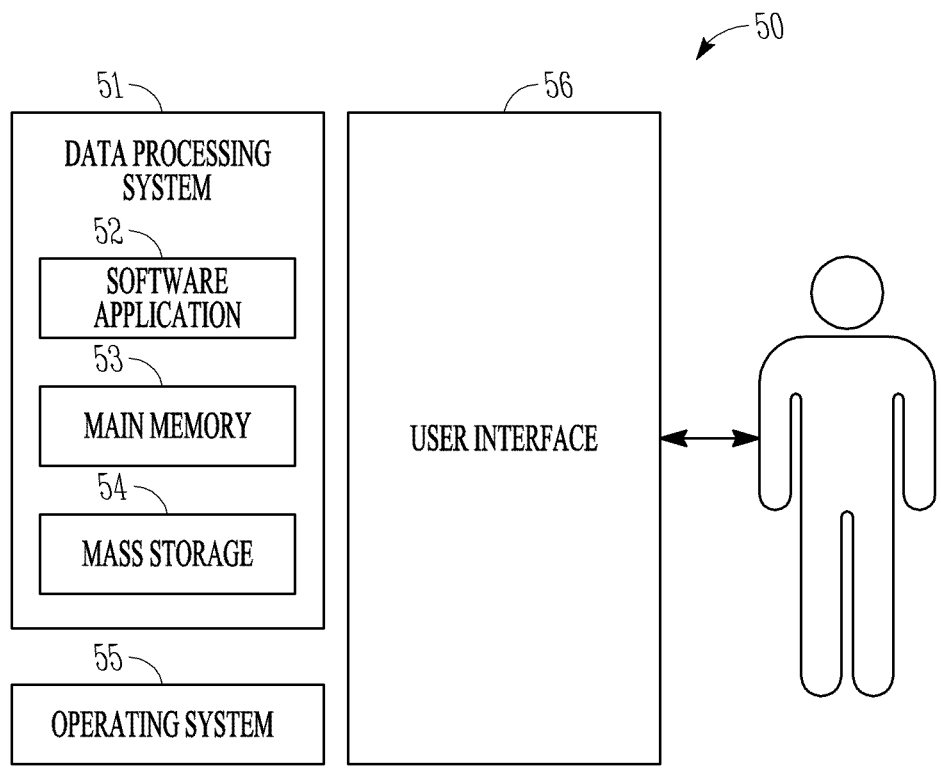
FIGS. 1A and 1B illustrate a flow diagram of a system, process and computer program according to the present technology.

The present technology addresses the problem of motion blur in an image, and in particular a digital image obtained from an image capture device such as a digital camera, or digitized from an analog photograph. In particular, the present technology is adapted for estimating the extent and direction of motion blur. In addition, the present technology is adapted to be used in image processing software or system applications. As illustrated in FIG. 1A, according to one embodiment 50 of the technology there is provided a module for estimating motion blur that is resident on a data processing system 51 for directing the operation of the data-processing system. Software application 52, stored in main memory 53 and on mass storage 54, includes a kernel or operating system 55 and a shell or interface 56. One or more application programs, such as software application 52, may be "loaded" (i.e., transferred from mass storage 54 into the main memory 53) for execution by the data-processing system 51. The data-processing system 51 receives user commands and data through a user interface 56; these inputs may then be acted upon by the data-processing system 51 in accordance with instructions from an operating system 58 and/or a software application 52.

Generally, program modules include but are not limited to routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Figure 1B:
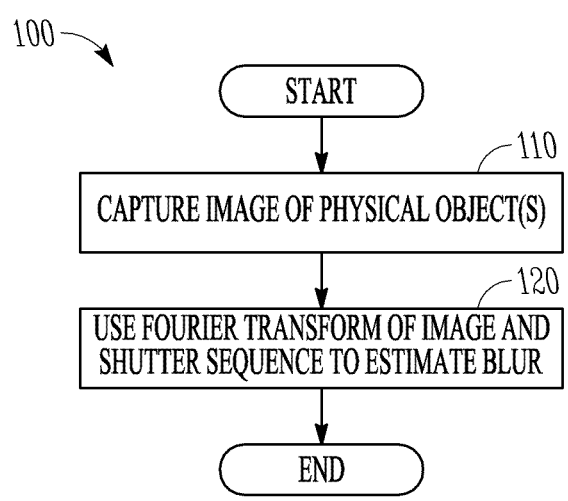

According to one example embodiment illustrated in FIG. 1B, the present system, method and software 100 estimates the kernel of one-dimensional (1D) motion blur from a single image (110) with prior knowledge of the way in which the shutter was triggered (the shutter sequence) using, in one example embodiment, the blur extent based on the ratio of the locations of the major side lobe of a Fourier spectrum of the image and that of a Fourier transform of the shutter sequence (120). Even though the details and amplitude of the resulting Fourier spectrum of the blurred image are altered by the image content, the general shape of the major peaks and valleys of the main lobe and side lobes of the Fourier spectrum still resemble the PSF (point spread function) of the shutter sequence. Accordingly, the amount of blur expands or shrinks the spectrum along the spatial frequency axis, and blur is estimated using this technical characteristic.

Figure 2A:
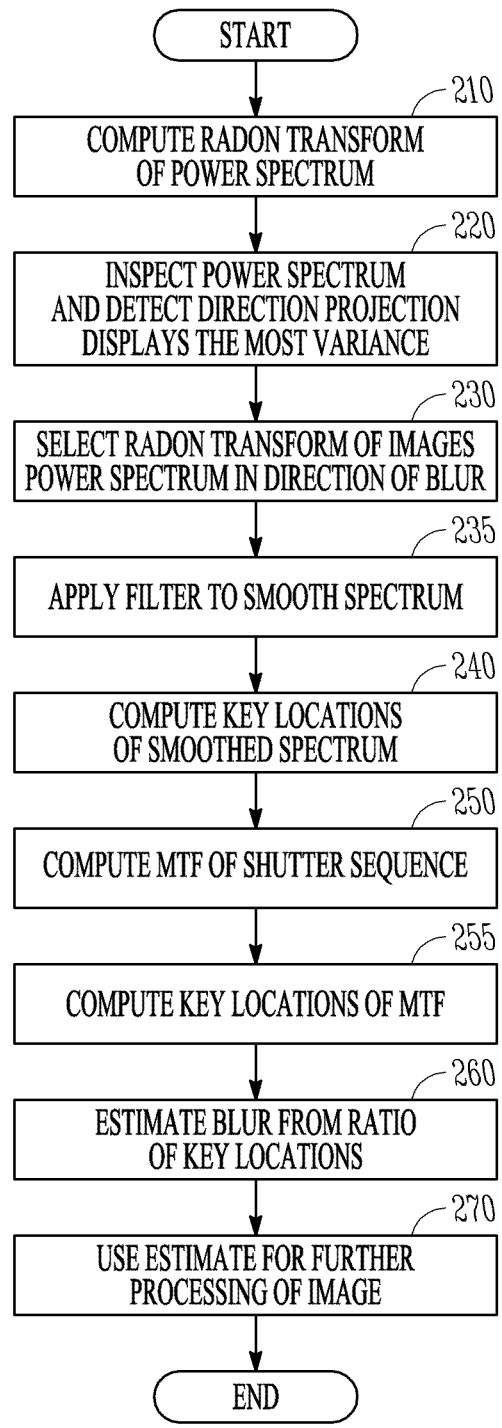
FIGS. 2A and 2B illustrate the process, system and computer program according to the present technology.

Referring now to FIG. 2A the method, software and system for determining the direction and extent of motion blur is illustrated in more detail. The first step in the process is to determine the direction of motion blur in the image. The radon transform of the power spectrum of the blurred image is computed (210). Because 1D motion blur attenuates high frequency information in the direction of motion. The direction of motion blur is detected using the direction in which middle and high frequencies are most muted. Assuming that the latent sharp image (i.e. the image to recover) is not highly anisotropic, this is done by inspecting the power spectrum of the image and detecting the direction in which a projection of the radon transform of the image's power spectrum displays the most variance (220). Having established the direction of motion, the radon transform of the images power spectrum in the direction of the blur is selected (230). A filter is applied to smooth the spectrum and remove noise (235). The key locations of the smoothed spectrum (KL1) are computed (240).

Figure 2B:
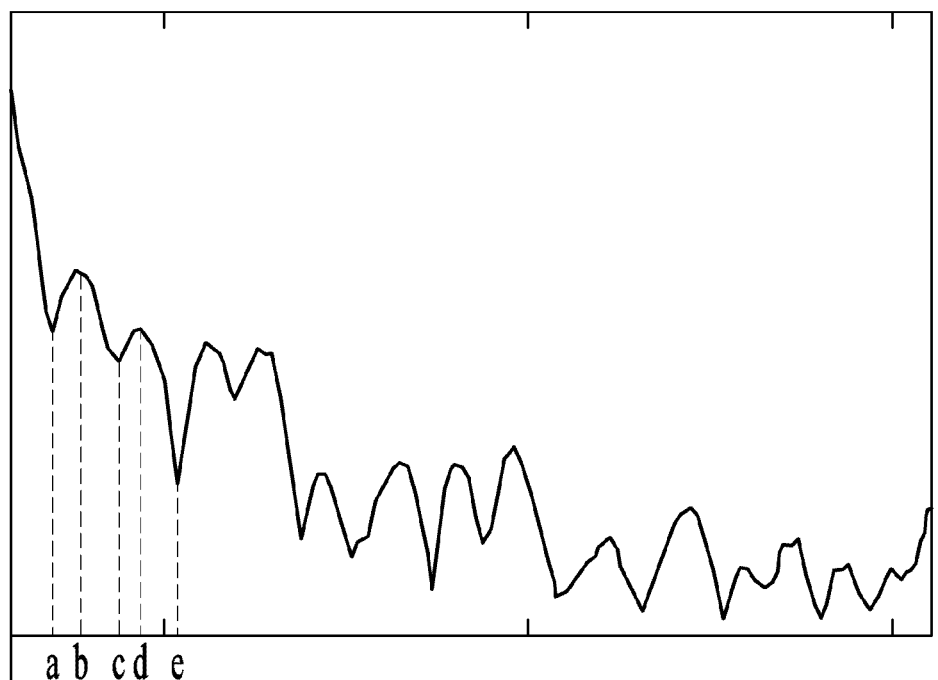
Figure 2B:
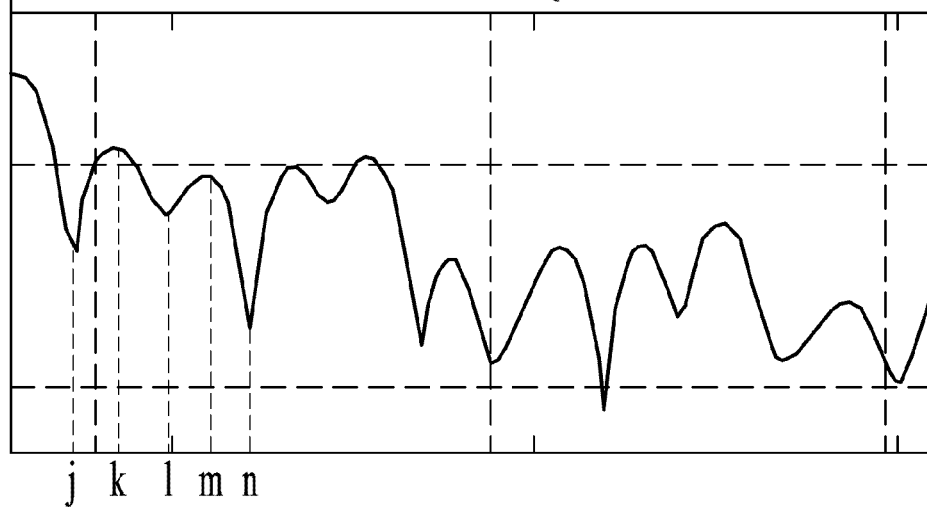

Key locations include the points at peaks and valleys of the spectrum, identified in the illustrative spectrum of FIG. 2B by lines a, b, c, d and e for the radon transform, and lines j, k, l, m and n for the MTF of shutter sequence transform. By the convolution theorem, this spectrum is the power spectrum of the latent sharp image multiplied by an envelope determined by the blur kernel. The product resembles a modulation transfer function (MTF) of the shutter sequence that is stretched or shrunken along the frequency axis. The amount of stretch and shrinkage corresponds to the extent of the blur. Therefore, given the shutter sequence, the MTF is computed (250). The key locations of the MTF (KL2) are also computed (255). The blur extent is then computed from the weighted sum of the ratios of the corresponding key locations from KL1 and KL2 (260). Optionally, the estimated motion blur is used in a further process, such as but not limited to removing or compensating for blur in the image or flagging or classifying the image for extent of blur (270).

According to one embodiment, as indicated above, key locations include the points at peaks and valleys of the spectrum, identified for valleys in the illustrative spectrum of FIG. 2B by lines a, b, c, d and e for the radon transform, and lines j, k, l, m and n for the MTF of shutter sequence. As illustrated in FIG. 2B, the inflection points of the MTF appear in the spectrum of the image. In one embodiment, the first N inflection points of both the radial spectrum and the nominal MTF are found. Blur extent is then found from weighted sum of ratios of inflection point locations (a/j, b/k, c/l, ... ).

According to another alternative embodiment, which increases the robustness of the process further, a weighted sum of the ratios of the first n lobes in the spectra are used to estimate blur. Further, according to one example embodiment, the positions of the valleys are used as opposed to peaks, since the valleys usually are more stable and narrower than peaks and would not be easily modified by the image content.

According to one embodiment, if a function $f$ represents an unknown density, then the Radon transform represents the scattering data obtained as the output of the imaging system. Hence the inverse of the Radon transform can be employed to reconstruct the original density from the scattering data. The Radon transform is closely related to the Fourier transform.

Figure 3:
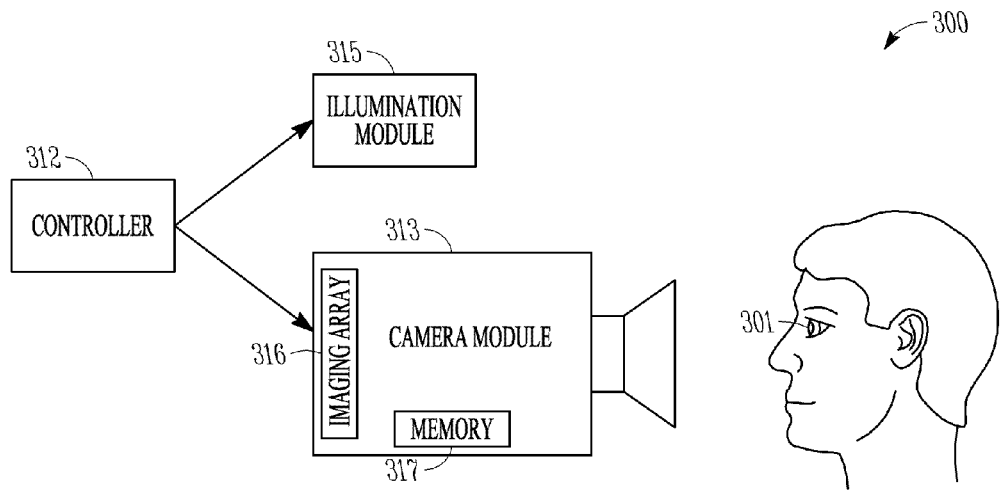
FIG. 3 illustrates a system diagram of a system to capture an image for blur estimation.

According to one example embodiment, the present technology is used in connection with an optical imaging system used to perform iris recognition. The NIR optical imaging system 300 of FIG. 3 can be implemented to include the method and software for image blur detection according to the technology described herein. As a general overview, system 300 has an NIR illuminator module 315 for illuminating the eye 301 of an intended subject, at least one camera module 313 for capturing images of an eye of an intended subject illuminated with visible or NIR light at an unconditionally eye-safe illumination level, and a controller 312 operably coupled to the camera modules and NIR illuminator module. For the purposes of iris recognition, the present system may perform automatic illumination, detection, acquisition and recognition of irises at ranges out to five meters (over 16 feet). Images are captured using an electronic imaging array 316 (such as, but not limited to, a charge coupled device) in camera module 313 and stored in a memory device 317 in the camera or in the controller 312.

The controller 312 may be any kind of computer processing unit (CPU) 312, such as a desk computer or a digital signal processor. An operating system runs on the processing unit 312 and may be a commercially available operating system. Instructions for the operating system and applications or programs are stored in storage devices, such as a hard drive.

Figure 4:
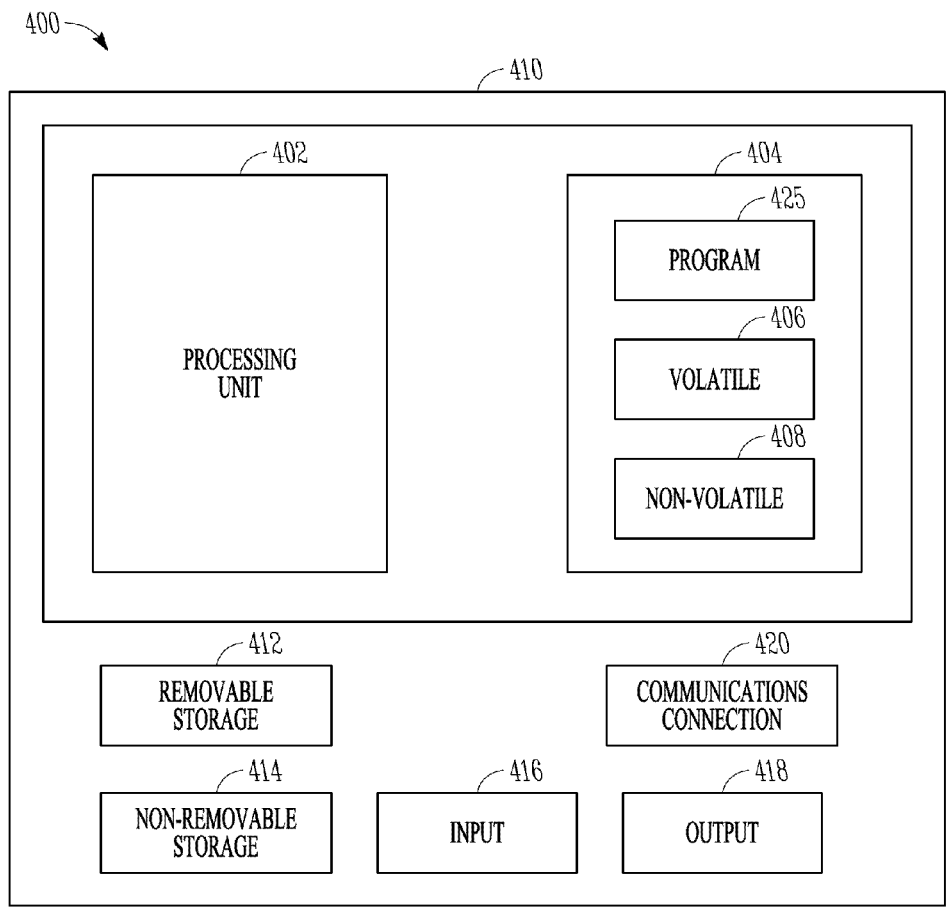
FIG. 4 illustrates an example computer system according to the present technology.

Alternatively, some or all of the controller functionality can be implemented as analog or digital circuitry instead of a computer processor. As illustrated in FIG. 4, an example embodiment 400 of the controller 312 is illustrated. System 400 executes programming for implementing the above-described process control and/or blur estimation algorithm. While system 400 is shown in this embodiment as controlling camera module 313 and illuminator module 315, it may also be used only to perform the motion blur estimation process. Further, while the motion blur estimation process is illustrated specifically for use in connection with images of eyes, it may be used for estimating blur in any image. According to one embodiment, the processes are implemented as software modules stored in one or more storage devices and executed on the system 400. A general computing device in the form of a computer 410 may include a processing unit 402, memory 404, removable storage 412, and non-removable storage 414. Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other tangible and physical medium capable of storing computer-readable instructions. Computer 410 may include or have access to a computing environment that includes input 416, output 418, and a communication connection 420. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks. Computer-readable instructions stored on a tangible and physical computer-readable medium in a non-transitory form are executable by the processing unit 402 of the computer 410. A hard drive, CD-ROM, and RAM are some examples of articles including a computer-readable medium. The computer-readable instructions are adapted, in one embodiment, to perform the image blur estimation process described herein, or a digitized form of the image stored in one of the disk storage facilities in the system 400.

Figure 5:
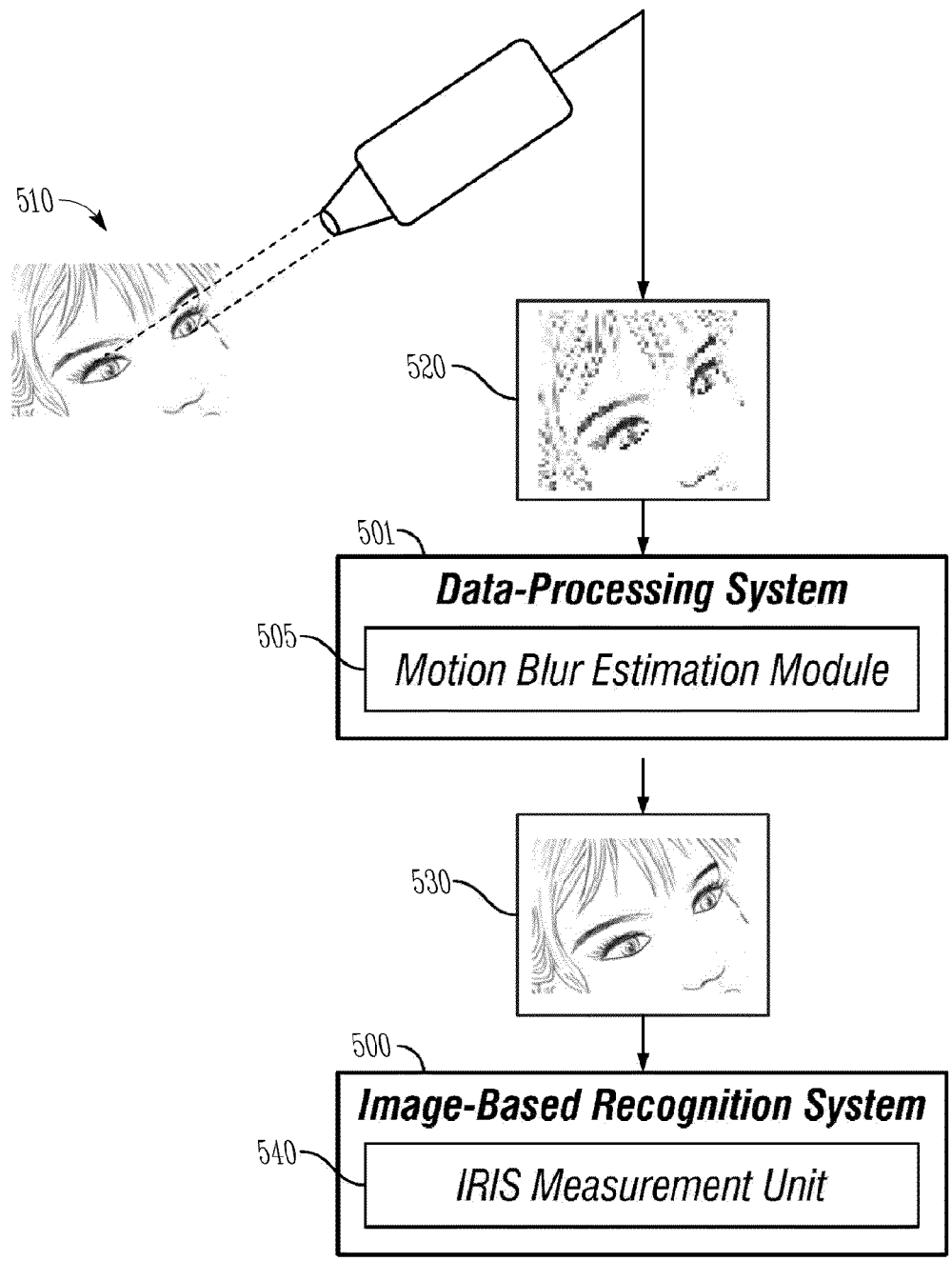
FIG. 5 illustrates an example image based recognition system configuration according to the present technology.

According to another embodiment illustrated in FIG. 5 there is provided an image-based recognition system 500 associated with the motion blur estimation process and software described herein. A motion blur estimation module 505 using one or more of the embodiments of motion blur process and software described herein, and associated with a data-processing system 501, generates a motion blur corrected image 530 of a subject 510 for use in a variety of image-based recognition systems such as, for example, an iris measurement unit 540. The iris recognition unit 540 may have major components which include iris localization, iris map feature extraction, encoding, and enroll/matching. In image acquisition, a digital image 520 capturing the eye of the subject 510 may be obtained at multiple resolutions, eye orientation and transition, under variant lighting illumination and in a noise laden environment utilizing an image capturing device. The motion blur estimation module 505 may perform post image processing with respect to the image 520 obtained from the image capturing device to significantly improve the resolution of the captured image 520.

According to one embodiment, the captured image (e.g., one-dimensional) represents an image scene that defines the original object. The image obtained from the image capturing device may include motion blur. In general, motion blur may be a common aspect that affects the quality of the image recorded by the image capturing device utilized in a variety of industrial and scientific applications that require monitoring of high-speed events. Examples of images that may include motion blur, and benefit from the present technology, include images of moving people or faces and images of moving vehicles, and license plates in particular.

According to one embodiment, the motion blur estimation module may be a software application including computer executable instructions executed by a data processing system such as that described above, or other computing system environment. The motion blur estimation module may run as a stand-alone digital video tool, an embedded function or may be incorporated into other digital image/video applications to provide enhanced functionality. Video display monitors are also included in some embodiments for operators to view the captured images pre and post processing to identify motion blur or remove it from the image.

Thus, as described above, the present embodiments are fast enough for real time implementations, particularly compared to prior techniques that require searching among a family of kernels. In addition, such prior art techniques may produce local minimum results, not the global minimum. Third, the true result may lie outside the search range, which is limited due to the computation requirement. The embodiments and examples set forth herein are presented to best explain the present technology and its practical application and to thereby enable those skilled in the art to make and utilize the technology. Those skilled in the art, however, will recognize that the foregoing description and examples have been presented for the purpose of illustration and example only. Other variations and modifications of the present technology will be apparent to those of skill in the art, and it is the intent of the appended claims that such variations and modifications be covered.

Generally, program modules include but are not limited to routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like. Further, the preceding discussion was intended to provide a brief, general description of suitable computing environments in which the system and method may be implemented, and not constitute an exhaustive list of all the various computing environments that are suitable for the present technology.

The description as set forth is not intended to be exhaustive or to limit the scope of the technology. Many modifications and variations are possible in light of the above teaching without departing from the scope of the following claims. It is contemplated that the use of the present technology can involve components having different characteristics. It is intended that the scope of the present technology be defined by the claims appended hereto, giving full cognizance to equivalents in all respects.

We claim:

1. A process comprising:
   determining a radon transform of the power spectrum of the blurred image;
   inspecting the power spectrum of the image and determining the direction of the blur by detecting the direction in which a projection of the radon transform of the image's power spectrum displays the most variance;
   selecting the radon transform of the images power spectrum in the direction of the blur;
   applying a filter to smooth the spectrum and remove noise;
   computing key locations of the smoothed spectrum, wherein the key locations include points at peaks and valleys of the spectrum;
   using the shutter sequence, computing a modulation transfer function (MTF) of the shutter sequence;
   computing key locations of the MTF; and
   computing blur extent in the image from the weighted sum of the ratios of the corresponding key locations from the smoothed spectrum and the MTF shutter sequence.

2. A system comprising:
   a computer system including a processor for executing one or more computer programs, the one or more computer programs operative on the computer system to process one or more digital images taken by a camera having a shutter, wherein the digital image depicts objects in a physical world, and wherein the one or more computer programs execute on the computer system to:
   determine a radon transform of the power spectrum of the blurred image;
   inspect the power spectrum of the image and determining the direction of the blur by detecting the direction in which a projection of the radon transform of the image's power spectrum displays the most variance;
   select the radon transform of the images power spectrum in the direction of the blur;
   apply a filter to smooth the spectrum and remove noise;
   compute key locations of the smoothed spectrum, wherein the key locations include points at peaks and valleys of the spectrum;
   use the shutter sequence, computing a modulation transfer function (MTF) of the shutter sequence;
   compute key locations of the MTF; and
   compute blur extent in the image from the weighted sum of the ratios of the corresponding key locations from the smoothed spectrum and the MTF shutter sequence.

* * * * *